United States Patent
Carlson

(10) Patent No.: US 7,809,412 B2
(45) Date of Patent: Oct. 5, 2010

(54) ELECTRONIC DEVICE HAVING A SINGLE SEAM HINGE

(75) Inventor: Christopher P Carlson, Mundelein, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 1042 days.

(21) Appl. No.: 11/461,107

(22) Filed: Jul. 31, 2006

(65) Prior Publication Data

US 2008/0026802 A1    Jan. 31, 2008

(51) Int. Cl.
*H04M 1/00* (2006.01)

(52) U.S. Cl. ............... 455/575.1; 455/128; 379/433.13

(58) Field of Classification Search .............. 455/575.1, 455/575.3, 90.3, 128, 347; 379/433.13, 428.01, 379/447; 439/11, 31, 467, 596
See application file for complete search history.

(56) References Cited

U.S. PATENT DOCUMENTS

| | | | | |
|---|---|---|---|---|
| 5,260,998 | A * | 11/1993 | Takagi | .................. 379/433.13 |
| 6,011,699 | A | 1/2000 | Murray et al. | |
| 6,083,010 | A * | 7/2000 | Daoud | ........................ 439/31 |
| 6,352,434 | B1 | 3/2002 | Emmert | |
| 6,439,905 | B2 * | 8/2002 | Andrews et al. | ............ 439/165 |
| 6,600,662 | B1 * | 7/2003 | Emmert et al. | .............. 361/814 |
| 7,479,927 | B2 * | 1/2009 | Scarpelli | ..................... 343/702 |
| 2001/0053674 | A1 * | 12/2001 | Katoh | .......................... 455/90 |
| 2002/0142736 | A1 * | 10/2002 | Shin | ............................ 455/90 |
| 2004/0189861 | A1 | 9/2004 | Tom | |
| 2005/0186996 | A1 | 8/2005 | Pan | |
| 2005/0261041 | A1 | 11/2005 | Im | |

FOREIGN PATENT DOCUMENTS

| | | |
|---|---|---|
| EP | 1594295 A | 11/2005 |
| EP | 1638296 A | 3/2006 |
| WO | 2006041270 A | 4/2006 |

OTHER PUBLICATIONS

Samsung SGH-Z105 User Guide, Vodafone live!, 2 pages.

* cited by examiner

*Primary Examiner*—CongVan Tran
(74) *Attorney, Agent, or Firm*—Hisashi D. Watanabe

(57) ABSTRACT

Disclosed are hinges with a single interface or single seam between two halves of the hinge, configured to route through the hinge a flexible circuit element to couple electronic circuitry in a first housing with electronic circuitry in a second housing. An axial shaft with an elongated slot is received by the two halves of the hinge. The shaft extends at least across a portion of the width of the first housing. To route the flexible circuit element, the elongated slot is configured to hold fixed the midsection of the flex cable, relative to the shaft during rotation of the shaft. The shaft has an outer circumference, and at least a portion of the shaft defines a shallow groove at the outer circumference. A portion of the flexible circuit element is wrapped around the shaft forming a radial service loop at the shallow groove to accommodate rotation of the shaft.

21 Claims, 6 Drawing Sheets

ELECTRONIC DEVICE HAVING A SINGLE SEAM HINGE

FIELD

This invention relates generally to hinged electronic devices, and more particularly to a hinge for an electronic device having a single seam and having a flexible circuit element routed through the hinge.

BACKGROUND

Mobile communication devices are very popular. According to the Cellular Telecommunications Industry Association (CTIA), at the end of 2005, over 200 million people in the United States alone use mobile telephones. PDAs, portable gaming devices, and other personal electronic devices are also popular and may provide communication capability.

Many mobile communication devices are designed to be foldable and in particular they may have a clamshell form factor. A foldable device typically includes two housings with a hinge mechanism, or other joint element, joining the two housings. A clamshell, or "flip" phone is in the active mode when it is in the open position, and is in an inactive mode when it is in the closed position. The hinge in many current clamshell form factor mobile communication devices includes three components joining the two housings having two interfaces between the components.

With so many mobile communication devices in use, consumers continually seek sleeker, more streamlined designs. Distinctive looks and aesthetic designs can provide manufacturers with a competitive edge in a crowded market. Accordingly, designers continually try to offer more stylish shapes and contours in electronic devices. For a sleek and distinctive look for a clamshell form factor device, it may be beneficial to incorporate a hinge with a single interface in the device. A hinge with single interface including fewer components than the current hinge designs may possibly enable easier, more efficient, and/or less expensive manufacturing processes.

DETAILED DESCRIPTION

Disclosed are hinges with a single interface or single seam between two parts of the hinge that is configured to route through the hinge a flexible circuit element to couple electronic circuitry in a first housing with electronic circuitry in a second housing. A center support shaft with an elongated slot is received by the two parts of the hinge. The center support shaft extends at least across a portion of the width of the first housing. To route the flexible circuit element, or flex cable through the hinge, an elongated slot is configured to hold fixed the midsection of the flex cable, relative to the center support shaft during rotation of the shaft. Furthermore, the center support shaft has an outer circumference, and at least a portion of the center support shaft defines a shallow groove at the outer circumference. A portion of the flexible circuit element is wrapped around the center support shaft forming a radial service loop at the shallow groove to accommodate rotation of the center support shaft. Beneficially, the below-described single interface or seam hinge design for electronic devices may facilitate electrical coupling of components across the single interface hinge.

The instant disclosure is provided to further explain in an enabling fashion the best modes of making and using various embodiments in accordance with the present invention. The disclosure is further offered to enhance an understanding and appreciation for the invention principles and advantages thereof, rather than to limit in any manner the invention. The invention is defined solely by the appended claims including any amendments of this application and all equivalents of those claims as issued.

It is further understood that the use of relational terms, if any, such as first and second, top and bottom, and the like are used solely to distinguish one from another entity or action without necessarily requiring or implying any actual such relationship or order between such entities or actions. Much of the inventive functionality and many of the inventive principles are best implemented with or in software programs or instructions and integrated circuits (ICs) such as application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts according to the present invention, further discussion of such software and ICs, if any, will be limited to the essentials with respect to the principles and concepts within the preferred embodiments.

Figure 1:
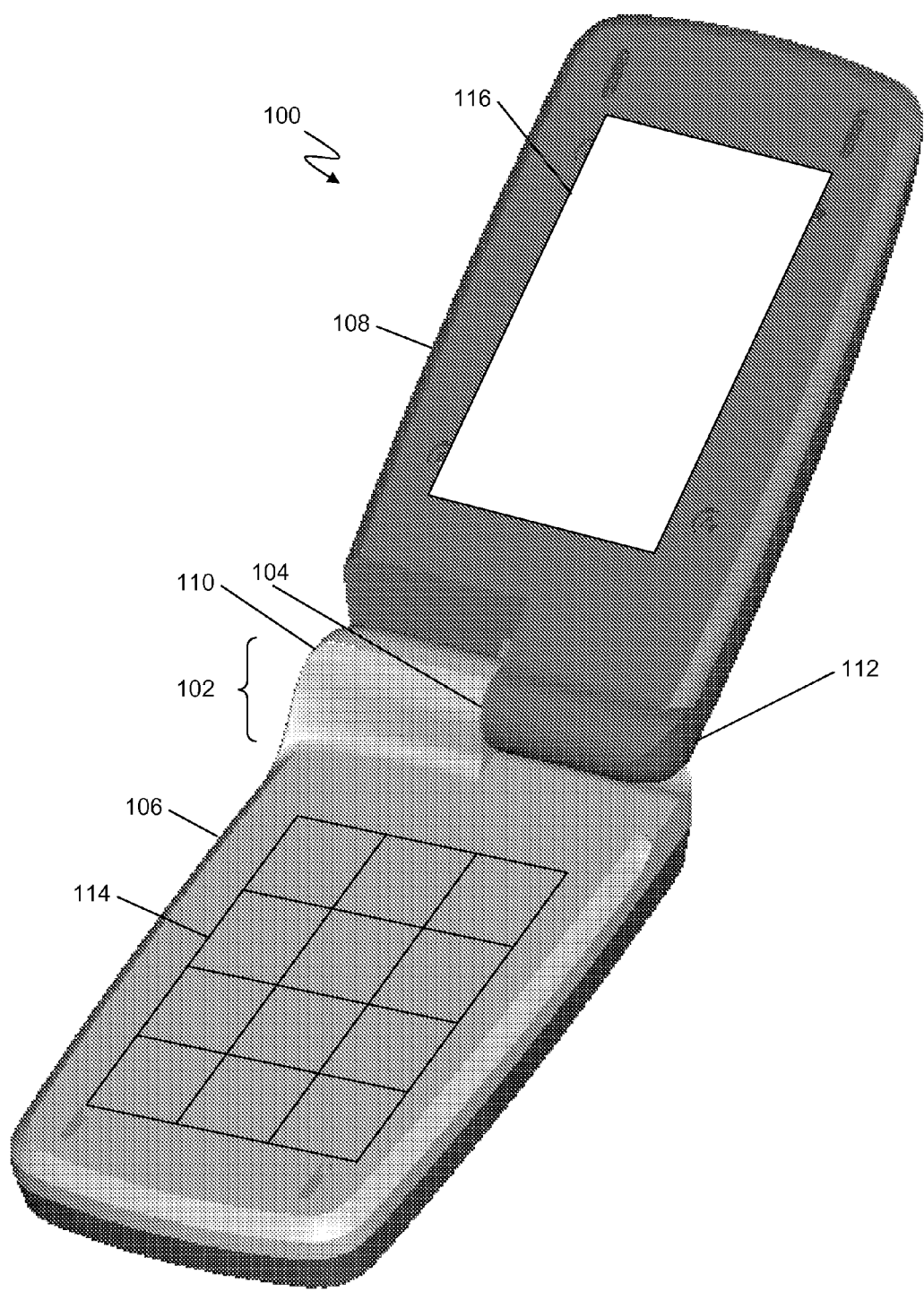
FIG. 1 depicts a mobile communication device incorporating an embodiment of a hinge having a single seam.

FIG. 1 shows a mobile communication device 100 incorporating a joint element or hinge 102 having a single seam or interface 104 according to an embodiment. Hinge 102 couples a first housing 106 of mobile communication device 100 with a second housing 108 of the mobile communication device, and is configured to movably connect the first housing and the second housing. The first housing 106 may be coupled to a first knuckle 110 of the hinge 102. The second housing 108 may be coupled to a second knuckle 112 of the hinge. First knuckle 110 and second knuckle 112 meet at the single interface or single seam 104. A knuckle is a mechanical element which encases and supports a portion of the hinge mechanism and provides attachment to a housing. A housing and its hinge knuckle may be one piece or coupled separate pieces. It is understood that a housing and a knuckle may be coupled in any manner. Briefly turning to FIG. 2, one or more fastening elements 244 may provide coupling or attachment of first knuckle 210 to the first housing 206. It is understood that any appropriate fastening element or fastener may be employed. In an alternative embodiment, the first knuckle may be integrally formed with a part of the first housing, for example, in an injection molding process. It is understood that any appropriate method of fabrication may be used for the first knuckle and the first housing, as well as for the second knuckle and the second housing. The single seam 104 can provide the sleek and distinctive look for a clamshell form factor electronic device sought by designers and consumers.

While FIG. 1 illustrates a mobile communication device 100, a mobile communication device may be implemented as a cellular telephone (also called a mobile phone). The mobile communication device 100 represents a wide variety of devices that have been developed for use within various networks. Such handheld communication devices include, for example, cellular telephones, messaging devices, personal digital assistants (PDAs), notebook or laptop computers incorporating communication modems, mobile data terminals, application specific gaming devices, video gaming devices incorporating wireless modems, and the like. Any of these portable devices may be referred to as a mobile station or user equipment. Herein, wireless communication technologies may include, for example, voice communication, the capability of transferring digital data, SMS messaging, Internet access, multi-media content access and/or voice over internet protocol (VoIP).

The first housing 106 of mobile communication device 100 has a width sufficient to include a keypad 114 to provide for user input. In a mobile communication device such as a portable telephone having a clamshell form factor, the first housing typically includes a controller, memory, a transceiver, and an antenna, among other electronic components or circuit elements. The second housing 108 may include a primary display screen 116 on which a user may view indicia relating to incoming communications, device status, a telephone book or other contacts list, and date and time of day, among other data, when the device is in an open position. The second housing 108 may include additional electronic components or circuit elements, for example, a secondary display screen on the other side of the second housing (not shown) so as to be visible when the mobile communication device is in a closed position. Electronic components such as the keypad 114 in the first housing 106 can be coupled to a controller in the first housing which in turn can be coupled to electronic components such as the display screen 116 in the second housing 108 by a flexible circuit element or flex cable 524 (see FIG. 5) which is routed through the hinge 102 in accordance with this discussion. Accordingly, the described hinges with a single interface or single seam 104 between two parts of the hinge 110 and 112 are configured to route through the hinge 102 a flexible circuit element 524 (see FIG. 5) to couple electronic circuitry in a first housing 106 with electronic circuitry in a second housing 108.

It is understood that the flex cable 524 (see FIG. 5) can be routed through the hinge in the opposite direction as that described below. Moreover, two or more flex cables or flexible circuit elements can be simultaneously routed. The description of a flex cable is intended to describe a plurality of types of flex cables as well. The routing of the flexible circuit element is discussed in detail below.

Figure 2:
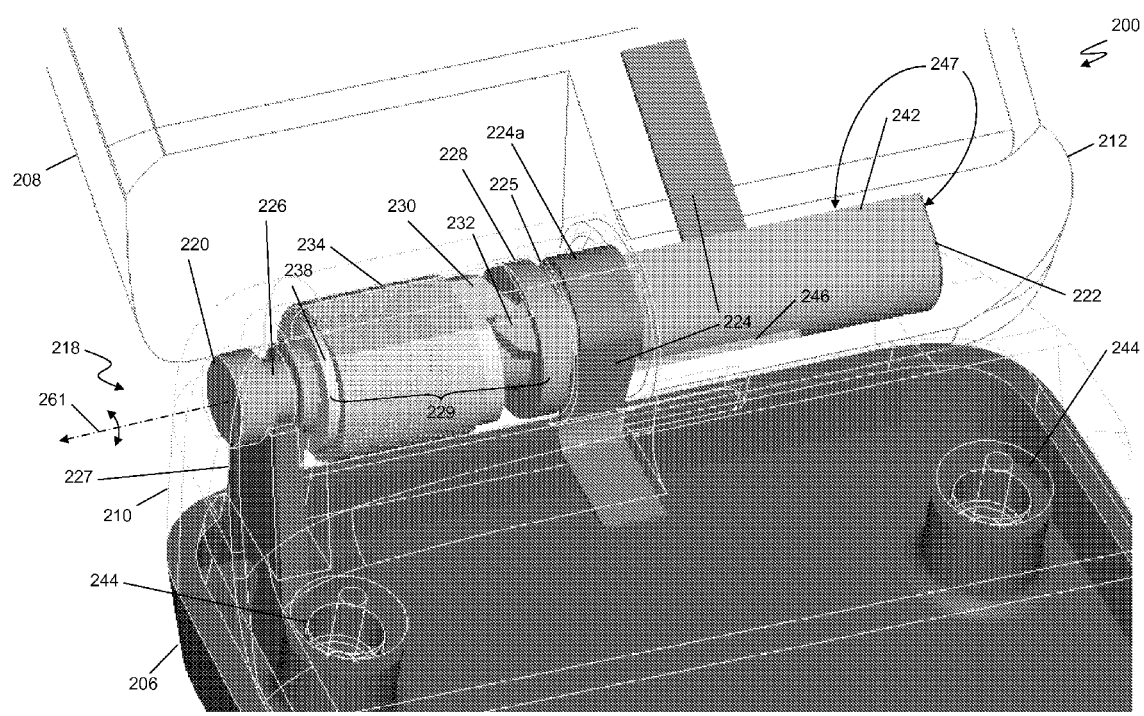
FIG. 2 shows in cutaway view an embodiment of a center support shaft in place in the device of FIG. 1.

FIG. 2 shows in cutaway view a center support shaft 218 in place in the device of FIG. 1, shown in FIG. 2 at 200. The center support shaft is also referred to herein as an axial shaft and as an elongated axial shaft. The center support shaft 218 has a structure and length sufficient to support the first knuckle 110 and/or the first housing 106 (see FIG. 1) and the second knuckle 112 and/or the second housing 108 and extends at least across a portion of the width of the first housing 106. To route the flexible circuit element 524 (see FIG. 5), or flex cable through the hinge 102 (see FIG. 1) the center support shaft 218 defines an elongated slot 346 (see FIG. 3) that is configured to hold fixed the midsection 524c of the flex cable 524 (see FIG. 5), relative to the center support shaft 218 during rotation. The rotation of the center support shaft 218 can coincide with the opening and closing of the device 100.

In FIG. 2, the first housing is shown at 206, with the first knuckle 110 (see FIG. 1) shown in outline at 210. Correspondingly, the second housing is shown at 208, and the second knuckle 112 is shown at 212, both shown in outline. As previously discussed, the first knuckle 210 and the second knuckle 212 define a single seam between them 104 (see FIG. 1). The center support shaft 218 includes a first portion or first end 220 and a second portion or second end 222. The first portion 220 of the shaft and the second portion 222 of the shaft together include substantially the length of the shaft 218. The first knuckle 210 is configured to receive the first portion or first end 220, and the second knuckle 212 is configured to receive the second portion or second end 222. Accordingly, the center support shaft 218 with an elongated slot 346 (see FIG. 3) is received by the two parts 110 and 112 (see FIG. 1) of the hinge 102.

Figure 3:
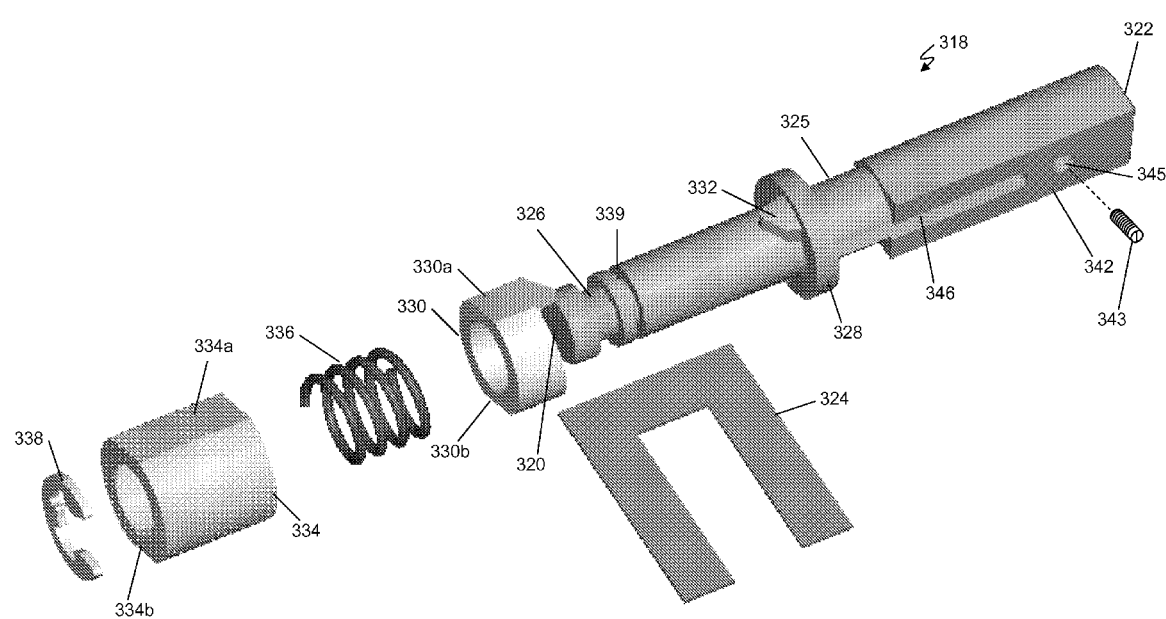
FIG. 3 shows an exploded view of an embodiment of elements of the hinge of FIG. 2, including the center support shaft.

Briefly turning to FIG. 3, as mentioned, the center support shaft 318 defines an elongated slot 346. The elongated slot 346 accommodates a portion of the flex cable 524 (see FIG. 5), and more particularly is configured to hold fixed a midsection 524c of the flex cable 524 relative to the shaft 218 during rotation of the shaft, as explained below in connection with FIG. 4. Accordingly, intermediate between the first end 220 of the center support shaft 218 and the second end 222 of the center support shaft 218 is a flex cable or flexible circuit element 224 (see also 524c of FIG. 5).

Returning to FIG. 2, the center support shaft 218 has an outer circumference, and at least a portion of the center support shaft 218 defines a shallow groove 225 at the outer circumference of the center support shaft 218. A portion of the flexible circuit element 224 can wrap around the center support shaft 218 at the shallow groove 225 forming a radial service loop 224a at the shallow groove to accommodate rotation of the center support shaft during the opening and closing of the device 100 (see FIG. 1). In this manner, the described single interface or seam hinge design for electronic devices can facilitate electrical coupling of components across the single interface hinge.

The center support shaft 218 can rotate with respect to the first knuckle 110, 210 depicted on the left side of the device 100 while it can be stationary with respect to the second knuckle 112, 212 depicted on the right side of the device 100. To support the rotation, the center support shaft 218 defines a shallow radial slot 226 at the first end 220 which is received in or mates with a yoke 227 included in the first housing 206. The slot cooperates with the yoke 227 to support rotation of the shaft 218 and inhibit translation of the shaft 218 with respect to the first housing 206 along the axis of rotation 261.

The hinge including the two knuckles and center support shaft as described herein may be any appropriate size to accommodate any size mobile communication device. The elongated slot, the shallow groove, and the shallow radial groove, and other elements of the center support shaft and/or hinge as described herein may be any size to accommodate any appropriate size flex cable, any size mobile communication device, and any size hinge.

Further in support of rotation of the center support shaft 218, a circumferential bearing surface 228 is additionally defined by the center support shaft. The circumferential bearing surface is proximal the single interface 104 (see FIG. 1). The first knuckle 210 defines a corresponding bearing surface configured to bear against the circumferential bearing surface 228, and provide another part of the support for the axial shaft 218. In this way the first knuckle 210 is configured to receive a first portion of the axial shaft, including the first end 220 of the shaft.

As discussed above, the center support shaft 218 can rotate with respect to the first knuckle 110, 210 depicted on the left side of the device 100 while it can be stationary with respect to the second knuckle 112, 212 depicted on the right side of the device 100. So that the center support shaft 218 remains stationary with respect to the second knuckle 212, the center support shaft 218 includes a keyed second end 242, configured to mate with and be received by a correspondingly keyed portion 247 of the second knuckle 212. The second knuckle 212 is configured to receive a second portion 222 of the center support shaft 218 that includes the keyed second end 242. The hinge 102 (see FIG. 1) includes a retaining member 343 such as a set screw received in aperture 345 and adapted to fasten the keyed receiving portion 247 (see FIG. 2) of the second knuckle 212 to the keyed second end 242 of the center support shaft 218. It is understood that any other suitable retaining member may be used. The axial shaft 218 is thus configured to retain its orientation with respect to the second knuckle 212, and to rotate with respect to the first knuckle 210, during operation of the hinge.

When the device 100, 200 is in the closed position, a force is exerted to keep the device in the closed position. In one embodiment, the center support shaft 218 further includes a cam mechanism 229 and a rotational cam follower 232 to exert force to keep the device in the closed position. Rotational cam follower 232 may be integrated with the shaft. The cam mechanism is substantially concentric with the axis 261 of the center support shaft and coupled to the first knuckle. The cam mechanism 229 is configured to activate opening and closing of the first housing and the second housing with respect to each other. The cam mechanism 229 and rotational cam follower 232 can be further configured to provide a force to keep the device 100, 200 in the open position when opened, as described below.

The cam mechanism 229 can be used during operation of the hinge to maintain the open position and/or the closed position. It is understood that in an embodiment the cam mechanism and/or the rotational cam follower may be configured to be either unidirectional or bidirectional, that is, bistable. A bidirectional hinge uses a cam profile or curvature of the cam surface that varies the direction of hinge force throughout the rotation of the hinge. The cam profile results in a closing force during a first portion of rotation, that is, from the closed position of the hinge. After the first portion of rotation, the cam profile reverses to create an opening force for the remainder of rotation.

On the other hand, a unidirectional hinge uses a cam profile that maintains an opening force throughout the hinge rotation. In a unidirectional hinge, an additional feature, for example a latch, may be included to overcome the hinge force to maintain the device in the closed position. Once the latch feature is disengaged, the force of the hinge is no longer restrained and opens the device. It is further understood that any appropriate cam mechanism, rotational cam follower, or similar devices can be used to maintain the open position and/or the closed position of the device 100, 200.

The cam mechanism 229 includes a rotational cam 230 that engages the rotational cam follower 232 during operation of the hinge 102 (see FIG. 1). Cam mechanism 229 also includes a cam cover 234 that provides protection and encasement for one end of rotational cam 230 and for a compression spring 336 (see FIG. 3). The compression spring 336 is also a part of the cam mechanism 229, but not visible in FIG. 2. The cam mechanism 229 in addition includes a spring clip 238 coupled to the center support shaft 218 near the first end of the shaft 220. The spring clip 238 maintains compression of the spring 336 (see FIG. 3) upon assembly of the cam mechanism 229. Operation of the cam mechanism 229 is explained below.

FIG. 3 shows an exploded view of elements of the hinge of FIG. 2, including the center support shaft 318 with first end 320 and second end 322. The flex cable 324 is shown separate, that is, not in position on the shaft. As mentioned above, the center support shaft defines a shallow groove 325. During operation of the hinge, a portion of the flex cable 324 is wrapped around the shallow groove 325 as a radial service loop 224a (see FIG. 2) accommodating rotation of the center support shaft 318.

Between the shallow groove 325 and the second end 322 is a keyed end portion 342 of the center support shaft 318. Keyed end portion 342 may also be referred to as a keyed end 342. As discussed above, keyed end 342 is configured to mate with a correspondingly keyed portion 247 (see FIG. 2) of the second knuckle 212.

As mentioned above, the center support shaft 318 also defines an elongated slot 346. Elongated slot 346 extends from the shallow groove 325 into the keyed end portion 342 of the shaft. In an embodiment, the elongated slot 346 may be a through-hole slot 246 (see FIG. 2) or any appropriate shape. The elongated slot 346 accommodates a portion of flex cable 324, as explained below in connection with FIG. 4.

As mentioned above, further in support of rotation of the center support shaft 218, a circumferential bearing surface 228 is additionally defined by the center support shaft. The circumferential bearing surface is proximal the single interface 104 (see FIG. 1). Circumferential bearing surface 328 bears against a corresponding surface of the first knuckle 210 (see FIG. 2), to support the axial shaft. Adjacent the circumferential bearing surface 228 is the rotational cam follower 332. The rotational cam follower 332 cooperates with the rotational cam 330 to aid in opening and/or closing of the hinge, and hence of the two housing electronic device to which the hinge is coupled.

In cooperation with the rotational cam follower 232, the rotational cam 330 can translate axially along the shaft. The compression spring 336 is coupled to the rotational cam 330 and configured to urge the rotational cam 330 against the rotational cam follower 332, so that the translation occurs while the rotational cam 330 is in contact with the rotational cam follower 332 during at least a portion of a rotation of the shaft about the axis of rotation 261 (see FIG. 2). The cam cover 334 covers a portion of the rotational cam 330 and covers the compression spring 336. Both the rotational cam 330 and the cam cover 334 have a keying feature on a portion of their respective surfaces.

A cam cover 334 can be configured to cover the compression spring 336 and at least a portion of the rotational cam 330, the cam cover 334 having a keyed surface, the keyed surface of the cam cover corresponding to the keyed surface of the rotational cam. The keying feature of the cam cover is shown as a flat surface on the top 334a and the bottom 334b of the cam cover 334 which mates the first knuckle 110, 210 (see FIGS. 1 and 2). The rotational cam 330 can have a keyed surface, such as a flat surface 330a and 330b that mates with the interior of the cam cover 334 to allow translation of the rotational cam 330 along the axis 261 (see FIG. 2) of the center support shaft 318 inside the cam cover 334 and to prevent rotation of the rotational cam 330 with respect to the cam cover 334. Since the keying feature of the cam cover 334 mates with a corresponding keying feature of the first knuckle 110, 210 (see FIGS. 1 and 2) the rotational cam 330 and cam cover 334 may not rotate with respect to the first knuckle 110, 210. Instead, the axial shaft 318, including rotational cam follower 332, rotate with respect to the rotational cam 330 and cam cover 334. The compression spring 336 is retained on the shaft between an end of the cam cover 334 and the rotational cam 330. A spring clip 338, as previously described, retains the cam cover on the axial shaft. Spring clip 338 is seated in a narrow radial slot 339. The spring clip is coupled to the center support shaft and configured to maintain the coupling of the cam mechanism to the shaft.

In an embodiment shown in FIG. 3, the rotational cam 330 has a unidirectional cam profile. The unidirectional cam profile can result in a force tending to open the hinge. Compression spring 336 exerts a restoring force to couple the rotational cam follower 332 and rotational cam 330, which, due to the unidirectional cam profile, becomes a torque about the axis 261 (see FIG. 2) tending to open the hinge. On closing the hinge, the rotational cam follower 332 maintains coupling with the rotational cam 330 while compressing the spring 336.

In an embodiment in which rotational cam 330 has a bidirectional cam profile, the torque on the center support shaft 318 can vary direction throughout the rotation of the hinge. Compression spring 336 exerts a restoring force which, during a first portion of the rotation of the hinge from the closed position becomes a torque about the axis 261 tending to close the hinge. After the first portion of the rotation, that is, once the hinge has been opened to a predetermined extent, the cam profile reverses to change direction of the resulting torque. Compression spring 336 then exerts a restoring force which becomes a torque about the axis 261 (see FIG. 2) tending to open the hinge. On closing the hinge, the rotational cam follower 332 maintains coupling with the rotational cam 330 while compressing the spring 336 during a portion of the rotation. Once the hinge has passed a predetermined point toward the closed position, the reversal of the rotational cam profile combined with the restoring force of compression spring 336 can result in a torque tending to close the hinge.

Figure 4:
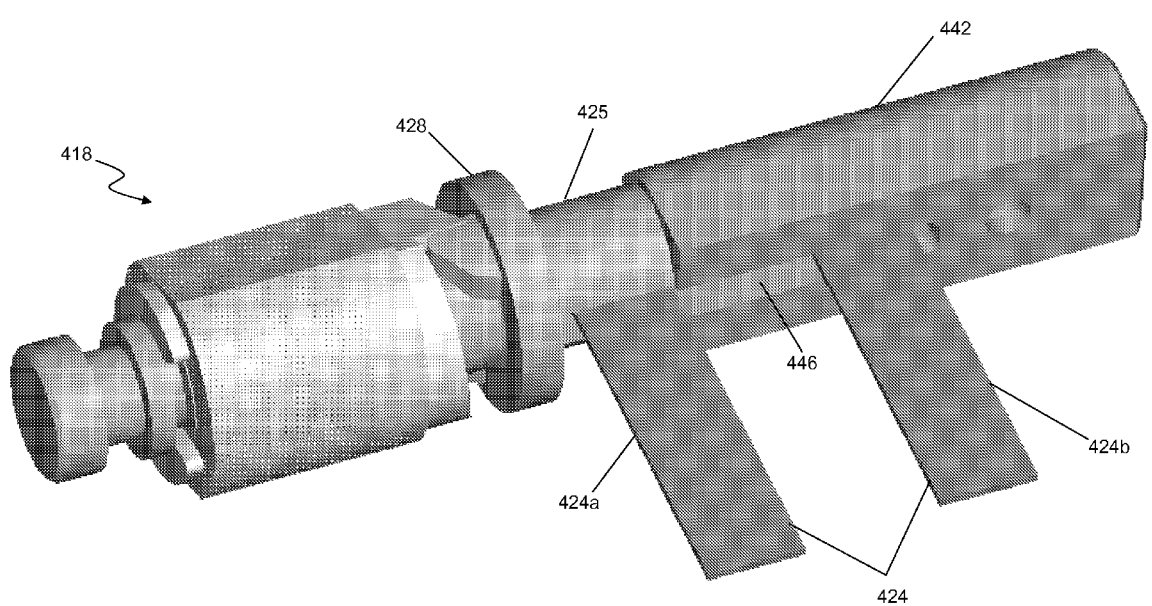
FIG. 4 shows a close-up view of an embodiment of the shaft of FIG. 2.

FIG. 4 shows in close-up view the center support shaft 418 with flex cable 424 received in the elongated slot 446. In this way, the single interface or single seam hinge design described herein for electronic devices may facilitate electrical coupling of components across the single interface hinge, since the first section 424a of flex cable 424 can be connected to one or more circuit elements of the first housing 106 (see FIG. 1) and the second section 424b of the flex cable 424 can be connected to one or more circuit elements of the second housing 108. With flex cable 424 in place, the first section 424a of the cable protrudes from the elongated slot at the shallow groove 425 and proximal the circumferential bearing surface 428. The second section 424b of the flex cable protrudes from the elongated slot distal the circumferential bearing surface 328. A midsection of the flex cable 524c (see FIG. 5) is received in the elongated slot 446. The second section and midsection retain their orientation with respect to the second knuckle 212 (see FIG. 2) due to the keyed second end 442 of the shaft 418, which as previously described, mates with a correspondingly keyed receiving portion 247 (see FIG. 2) of the second knuckle 212. As was discussed above in connection with FIG. 2, a portion of the first section 424a of the flex cable 424 protruding at the shallow groove 425 is wrapped about the center support shaft 418, to form a radial service loop 224a (see FIG. 2). When the center support shaft 418 rotates, the radial service loop 224a tightens or loosens as appropriate, to accommodate rotation of the center support shaft 418 without undue strain on the flex cable 424. The flex cable 424 is configured to be routed through the elongated slot 446 in the manner described herein.

Figure 5:
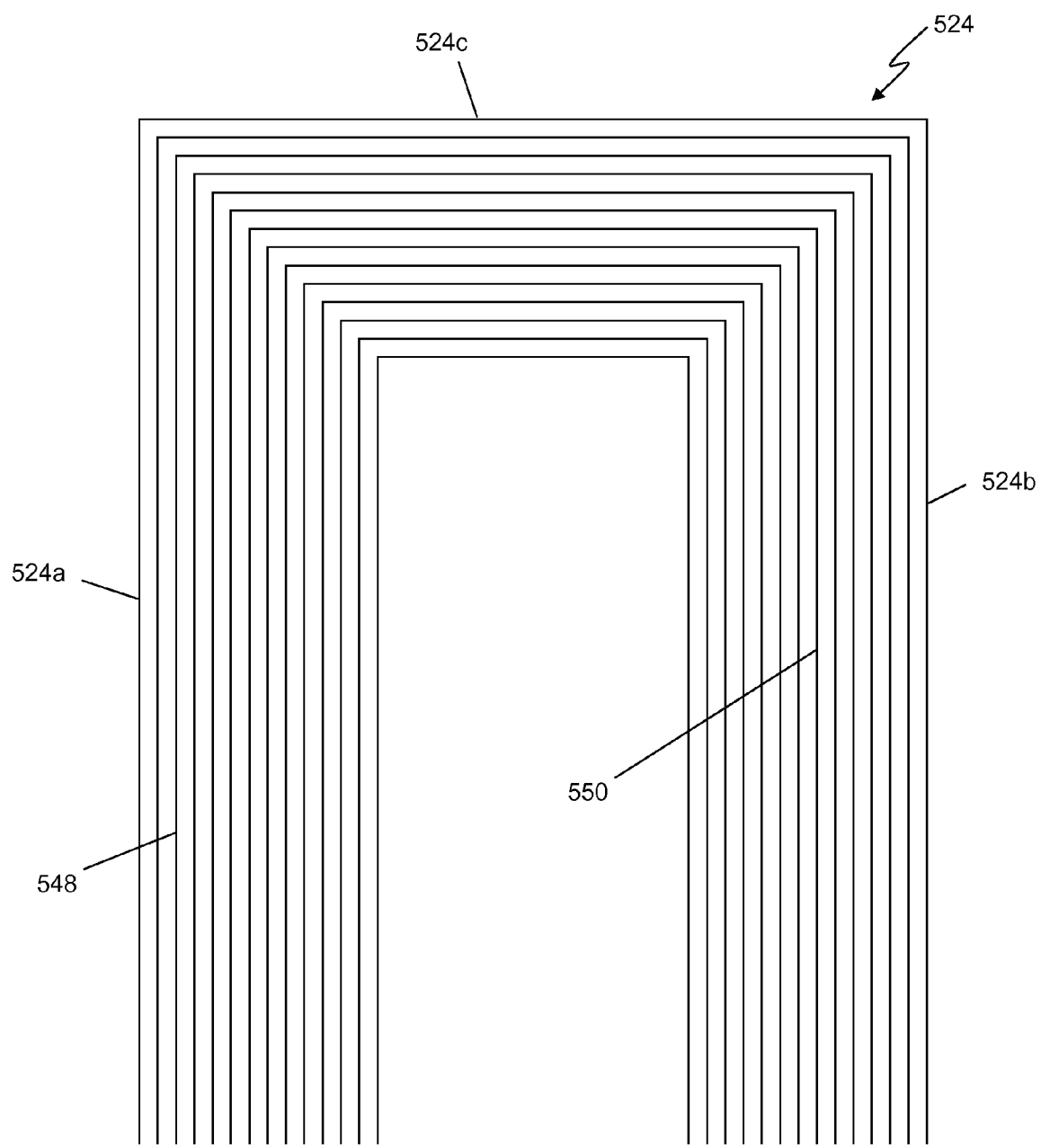
FIG. 5 shows detail of a flexible circuit element having a first section, a second section, and a midsection, according to an embodiment.

FIG. 5 shows detail of a flexible circuit element 524 having a first section 524a, a section 524b, and a midsection 524c, according to an embodiment. Flexible circuit element or flex cable 524 includes a plurality of conductors. By way of example, in FIG. 5, conductors 548 and 550 are identified. In an embodiment, flex cable 524 may include a flexible substrate on which flexible conducting traces are supported. The conducting traces may be terminated at solder pads, at zero-insertion-force (ZIF) connectors, or in any appropriate manner in order that flex cable 524 can connect a circuit element of the first housing 106 (see FIG. 1) and a circuit element of the second housing 108 (see FIG. 1).

Figure 6:
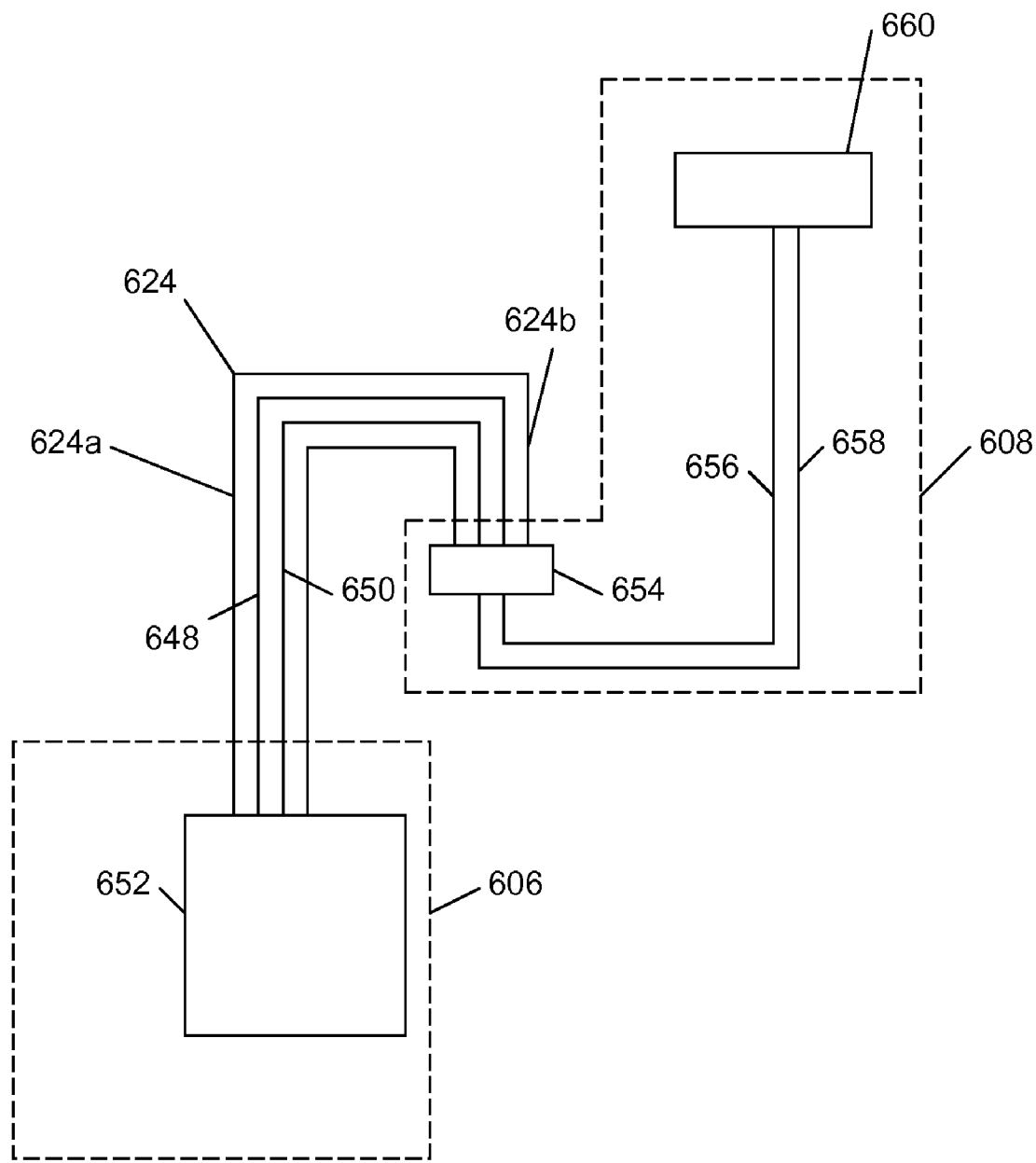
FIG. 6 illustrates an embodiment of a connection between the flexible circuit element and electronic components of a first housing and a second housing.

FIG. 6 illustrates a connection between the flexible circuit element 624 and electronic components of a first housing 106 (see FIG. 1) and a second housing 108. The first section 624a of the flexible circuit element 624 is configured to connect to a first circuit element in the first housing 606. The second section 624b of the flexible circuit element 624 is configured to connect to a second circuit element in the second housing 608. First housing 606 and second housing 608 are illustrated schematically and shown in dashed outline. Flex cable 624 is shown to connect a first circuit element 652 in the first housing 606 to a second circuit element 654 in the second housing 608. Circuit element 652 may be, for example, a controller. It is understood that circuit element 652 may be any other electronic component. Circuit element 654 may be, for example a ZIF connector, a solder strip, an integrated circuit (IC), or any other electronic component. As shown, conductors 648 and 650 of flex cable 624 connect circuit element 652 to circuit element 654.

Circuit element 654 may further be connected to circuit element 660 by conductors 656 and 658 in the second housing 608. Circuit element 660 may be for example a display device or a display driver. It is understood that circuit element 652, as well as flex cable 624, may be connected to other circuit elements of first housing 606. It is further understood that flex cable 624 may be connected to other circuit elements of the second housing.

The above-described hinges have a single interface or single seam between two knuckles or halves of the hinge, and are configured to route a flexible circuit element through the hinge to couple one or more circuit elements in the first housing with one or more circuit elements in the second housing. An axial shaft with an elongated slot and a shallow groove provides support both for rotation of the hinge and for the flexible circuit element during rotation. The axial shaft extends at least across a portion of the width of the first housing. Beneficially, the above-described single interface or seam hinge design for electronic devices may facilitate electrical coupling of components across the single interface hinge. The single seam can provide the sleek and distinctive look for a clamshell form factor electronic device sought by designers and consumers.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) was chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally and equitable entitled.

The invention claimed is:

1. An electronic device comprising:
   a first housing including a first circuit element;
   a second housing including a second circuit element;
   a flexible circuit element configured to connect the first circuit element and the second circuit element; and
   a joint element comprising:
      a first knuckle at a first end of the joint element coupled to the first housing; and
      a second knuckle at a second end of the joint element coupled to the second housing;
      wherein the joint element is configured with a single interface between the first knuckle and the second knuckle to movably join the first housing and the second housing, and is configured to route the flexible circuit element from the first housing to the second housing.

2. The device of claim 1, further comprising:
   a center support shaft having a first end and a second end, the center support shaft defining an elongated slot intermediate between the first end and the second end;
   wherein the first knuckle is configured to receive the first end of the shaft and the second knuckle is configured to receive the second end of the shaft; and
   wherein the flexible circuit element is further configured to be routed through the elongated slot.

3. The device of claim 1, wherein the first housing comprises a yoke, the device further comprising:
   a center support shaft having a first end and an axis of rotation, the center support shaft defining a shallow radial slot at the first end to mate with the yoke, the slot configured to support rotation of the shaft and inhibit translation of the shaft with respect to the first housing along the axis of rotation.

4. The device of claim 3, further comprising:
   a keyed receiving portion on the second knuckle;
   a keyed second end of the center support shaft, keyed to mate with the keyed receiving portion of the second knuckle; and
   a retaining member adapted to fasten the keyed receiving portion of the second knuckle to the keyed second end of the center support shaft.

5. The device of claim 1, further comprising:
   a center support shaft having a first end and a second end; and
   a cam mechanism substantially concentric with the center support shaft and coupled to the first knuckle;
   wherein the first knuckle is configured to receive the first end of the shaft and the second knuckle is configured to receive the second end of the shaft, and wherein the cam mechanism is configured to activate opening and closing of the first housing and the second housing with respect to each other.

6. The device of claim 5, wherein the center support shaft has an axis of rotation, and comprises a rotational cam follower intermediate between the first end and the second end, and wherein the cam mechanism comprises:
   a rotational cam having a keyed surface, and configured to translate axially along the center support shaft while in contact with the rotational cam follower during at least a portion of a rotation of the shaft about the axis of rotation;
   a compression spring coupled to the rotational cam and configured to exert a force urging the rotational cam against the rotational cam follower;
   a cam cover configured to cover the compression spring and at least a portion of the rotational cam, the cam cover having a keyed surface, the keyed surface of the cam cover corresponding to the keyed surface of the rotational cam; and
   a spring clip coupled to the center support shaft and configured to maintain the coupling of the cam mechanism to the center support shaft.

7. The device of claim 1, further comprising:
   a center support shaft having a first end and a second end, the center support shaft defining a circumferential bearing surface intermediate between the first end and the second end, the circumferential bearing surface proximal the single interface;
   wherein the first knuckle is configured to receive the first end of the shaft, and defines a bearing surface configured to bear against the circumferential bearing surface of the center support shaft.

8. A hinge for movably connecting a first housing having a first circuit element and a second housing having a second circuit element, the hinge comprising:
   a flex cable having a first section, a second section, and a midsection, the first section configured to connect to the first circuit element and the second section configured to connect to the second circuit element;
   an axial shaft having a first end and a second end, the axial shaft defining an elongated slot intermediate between the first end and the second end to hold fixed the midsection of the flex cable relative to the shaft during rotation of the shaft;
   a first knuckle configured to be coupled to the first housing, and configured to receive the first end of the axial shaft and to rotate with respect to the axial shaft; and
   a second knuckle configured to be coupled to the second housing, and configured to receive the second end of the axial shaft.

9. The hinge of claim 8, wherein:
   the hinge is configured with a single interface between the first knuckle and the second knuckle, the hinge configured to movably connect the first housing and the second housing.

10. The hinge of claim 8, wherein the axial shaft defines the elongated slot as a through-hole slot.

11. The hinge of claim 8, further comprising:
    a keyed receiving portion on the second knuckle;
    a keyed second end of the axial shaft, keyed to mate with the keyed receiving portion of the second knuckle; and
    a retaining member adapted to fasten the keyed receiving portion of the second knuckle to the keyed second end of the axial shaft.

12. A hinge for movably connecting a first housing having a first circuit element and a second housing having a second circuit element, the hinge comprising:
    an axial shaft having an outer circumference, at least a portion of the axial shaft defining a shallow groove at the outer circumference;
    a first knuckle configured to be coupled to the first housing, and configured to receive a first portion of the axial shaft and to rotate with respect to the axial shaft;
    a second knuckle configured to be coupled to the second housing, and configured to receive a second portion of the axial shaft; and
    a flexible circuit element configured to connect the first circuit element and the second circuit element;

wherein a portion of the flexible circuit element is wrapped around the axial shaft forming a radial service loop at the shallow groove to accommodate rotation of the axial shaft.

13. The hinge of claim 12, wherein:
the hinge is configured with a single seam between the first knuckle and the second knuckle, the hinge configured to movably connect the first housing and the second housing.

14. The hinge of claim 12, wherein:
the axial shaft has a first end and a second end, the axial shaft defining an elongated slot intermediate between the first end and the second end; and
the flexible circuit element is further configured to be routed through the elongated slot.

15. A hinge for movably connecting a first housing and a second housing, the first housing having a width, the hinge comprising:
an elongated axial shaft having a length and an axis of rotation, the length of the axial shaft extending at least across a portion of the width of the first housing;
a first knuckle configured to be coupled to the first housing, and configured to receive a first portion of the axial shaft and to rotate with respect to the axial shaft;
a second knuckle configured to be coupled to the second housing, and configured to receive a second portion of the axial shaft;
wherein the first portion of the axial shaft and the second portion of the axial shaft comprise substantially the length of the axial shaft; and
wherein the first knuckle and the second knuckle define a single seam therebetween.

16. The hinge of claim 15, further comprising:
a first circuit element in the first housing;
a second circuit element in the second housing; and
a flexible circuit element configured to connect the first circuit element and the second circuit element;
wherein:
the elongated axial shaft has a first end and a second end, and defines an elongated slot intermediate between the first end and the second end; and
the flexible circuit element is configured to be routed through the elongated slot.

17. The hinge of claim 15, further comprising:
a first circuit element in the first housing;
a second circuit element in the second housing; and
a flexible circuit element configured to connect the first circuit element and the second circuit element;
wherein:
the elongated axial shaft has an outer circumference;
at least a portion of the axial shaft defines a shallow groove at the outer circumference; and
a portion of the flexible circuit element is wrapped around the axial shaft forming a radial service loop at the shallow groove to accommodate rotation of the axial shaft.

18. The hinge of claim 15, wherein:
the first housing comprises a yoke; and
the elongated axial shaft has a first end and an axis of rotation, the shaft defining a shallow radial slot at the first end to mate with the yoke, the slot configured to support rotation of the shaft and inhibit translation of the shaft with respect to the first housing along the axis of rotation.

19. The hinge of claim 18, further comprising:
a keyed receiving portion on the second knuckle;
a keyed second end of the elongated shaft, keyed to mate with the keyed receiving portion of the second knuckle; and
a retaining member adapted to fasten the keyed receiving portion of the second knuckle to the keyed second end of the shaft.

20. The hinge of claim 15, wherein the elongated axial shaft has a first end and a second end, the hinge further comprising:
a cam mechanism coupled to the elongated axial shaft intermediate between the first end and the second end.

21. The hinge of claim 20, wherein the elongated axial shaft comprises an integrated rotational cam follower intermediate between the first end and the second end, and wherein the cam mechanism comprises:
a rotational cam having a keyed surface, and configured to translate axially along the axial shaft while in contact with the rotational cam follower during at least a portion of a rotation of the shaft about the axis of rotation;
a compression spring coupled to the rotational cam and configured to exert a force urging the rotational cam against the rotational cam follower;
a cam cover configured to cover the compression spring and at least a portion of the rotational cam, the cam cover having a keyed surface, the keyed surface of the cam cover corresponding to the keyed surface of the rotational cam; and
a spring clip coupled to the center support shaft and configured to maintain the coupling of the cam mechanism to the shaft.

* * * * *